United States Patent
Yoon et al.

(10) Patent No.: US 9,379,891 B2
(45) Date of Patent: Jun. 28, 2016

(54) METHOD AND SYSTEM FOR ID-BASED ENCRYPTION AND DECRYPTION

(71) Applicants: SAMSUNG SDS CO., LTD., Seoul (KR); SNU R&DB FOUNDATION, Seoul (KR)

(72) Inventors: Hyo Jin Yoon, Yongin-si (KR); Jung Hoon Sohn, Seoul (KR); Seon Young Lee, Seoul (KR); Hyung Tae Lee, Seoul (KR); Jung Hee Cheon, Gwacheon Si (KR)

(73) Assignees: SAMSUNG SDS CO., LTD., Seoul (KR); SNU R&DB FOUNDATION, Seoul (KR)

(*) Notice: Subject to any disclaimer, the term of this patent is extended or adjusted under 35 U.S.C. 154(b) by 234 days.

(21) Appl. No.: 14/067,284

(22) Filed: Oct. 30, 2013

(65) Prior Publication Data
US 2014/0192976 A1 Jul. 10, 2014

(30) Foreign Application Priority Data
Oct. 31, 2012 (KR) .................. 10-2012-0122508

(51) Int. Cl.
*H04L 9/08* (2006.01)
*H04L 9/30* (2006.01)

(52) U.S. Cl.
CPC ............ *H04L 9/0861* (2013.01); *H04L 9/0847* (2013.01); *H04L 9/3013* (2013.01)

(58) Field of Classification Search
None
See application file for complete search history.

(56) References Cited

U.S. PATENT DOCUMENTS

| | | | | |
|---|---|---|---|---|
| 5,664,017 | A * | 9/1997 | Gressel et al. | 380/30 |
| 7,986,778 | B2 * | 7/2011 | Harrison et al. | 380/30 |
| 2002/0071553 | A1 * | 6/2002 | Shirai et al. | 380/42 |
| 2003/0081785 | A1 * | 5/2003 | Boneh et al. | 380/277 |
| 2006/0215837 | A1 * | 9/2006 | Chen et al. | 380/44 |
| 2007/0121934 | A1 * | 5/2007 | Futa et al. | 380/28 |
| 2008/0162935 | A1 * | 7/2008 | Ginzboorg et al. | 713/170 |
| 2009/0307492 | A1 * | 12/2009 | Cao et al. | 713/169 |
| 2010/0104094 | A1 * | 4/2010 | Takashima | 380/28 |
| 2013/0028415 | A1 * | 1/2013 | Takashima et al. | 380/44 |
| 2013/0287206 | A1 * | 10/2013 | Hattori et al. | 380/30 |
| 2013/0322621 | A1 * | 12/2013 | Yoon et al. | 380/44 |
| 2013/0336478 | A1 * | 12/2013 | Nagai | H04L 9/0861 380/44 |

FOREIGN PATENT DOCUMENTS

KR EP1526676 * 10/2004

OTHER PUBLICATIONS

Abdalla et al. Verifiable Random Functions from Identity-Based Key Encapsulation, EUROCRYPT 2009, LNCS 5749, pp. 554-571, 2009.*

(Continued)

*Primary Examiner* — Peter Poltorak
(74) *Attorney, Agent, or Firm* — Sughrue Mion, PLLC

(57) ABSTRACT

Provided are identifier (ID)-based encryption and decryption methods and apparatuses for the methods. The ID-based encryption method includes having, at a transmitting terminal, a transmitting-side private key corresponding to a transmitting-side ID issued by a key issuing server, generating, at the transmitting terminal, a session key using the transmitting-side ID, a receiving-side ID, and the transmitting-side private key, extracting, at the transmitting terminal, a secret key from at least a part of the session key, and encrypting, at the transmitting terminal, a message using a previously set encryption algorithm and the secret key.

19 Claims, 4 Drawing Sheets

(56) References Cited

OTHER PUBLICATIONS

Boyd et al. Security of Two-Party Identity-Based Key AGreement, Mycrypt, LNCS 3715, pp. 229-243, 2005.*

Fujikoka et al. Strongly Secure Authenticated Key Exchange from Factoring, Codes, and Lattices, PKC 2012, LNCS 7293, pp. 467-484, 2012.*

Intel Corporation, Content Protection for Recordable Media Specification. SD Memroy Card Book Common Part, Rev. 0.97, Dec. 2010.*

Cakulev et al., "IBAKE: Identity-Based Authenticated Key Exchange", RFC 6539, 2012.*

Lee et al. "Cryptanalysis of Secure Key Exchange Protocol between STB and Smart Card in IPTV Broadcasting", ISA 2009, LNCS 5576, pp. 797-803, 2009.*

Nguyen Simplifying Peer-to-Peer Device Authentication Using Identity-Based Cryptography, 0769526225, IEEE 2006.*

Selvi et al. "Identity Based Self Delegated Signature-Self Proxy Signatures", 9780769541594, IEEE 2010.*

Yoon et al., "Batch Verifications with ID-Based Signatures", LNCS 3506, pp. 233-248, 2005.*

* cited by examiner

METHOD AND SYSTEM FOR ID-BASED ENCRYPTION AND DECRYPTION

CROSS-REFERENCE TO RELATED APPLICATION

This application claims priority to and the benefit of Republic of Korea Patent Application No. 10-2012-0122508 filed on Oct. 31, 2012, the disclosure of which is incorporated herein by reference in its entirety.

BACKGROUND

1. Field

The present disclosure relates to technology for encrypting and decrypting a message, and more particularly, to identifier (ID)-based encryption and decryption methods and apparatuses for the methods.

2. Discussion of Related Art

Recently, ID-based cryptography is newly attracting attention in the big data trend and environments of the Internet of Things. Also, with the advent of various security issues in cloud environments, a need for use of ID-based cryptography is increasing, and in particular, there is a need for ID-based cryptography that can be applied not to existing personal computers (PCs) or server environments but to small terminals such as mobile terminals. However, existing ID-based cryptography mostly employs pairing, thus involving too much calculation and being too complex to be applied to small terminals, such as a mobile terminal that is a client terminal. To solve this problem, a method employing a lattice has been introduced. The method employing a lattice shows excellent calculation performance, but has a drawback in that the sizes of parameters such as a public key, a ciphertext, etc. are too large.

SUMMARY

The present disclosure is directed to providing a message encryption and decryption algorithm that can ensure sufficient stability even with a small amount of calculation and a small ciphertext size.

According to an aspect of the present disclosure, there is provided an identifier (ID)-based encryption method including: having, at a transmitting terminal, a transmitting-side private key corresponding to a transmitting-side ID issued by a key issuing server; generating, at the transmitting terminal, a session key using the transmitting-side ID, a receiving-side ID, and the transmitting-side private key; extracting, at the transmitting terminal, a secret key from at least a part of the session key; and encrypting, at the transmitting terminal, a message using a previously set encryption algorithm and the secret key.

According to another aspect of the present disclosure, there is provided an ID-based decryption method including: having, at a receiving terminal, a receiving-side private key corresponding to a receiving-side ID issued by a key issuing server; generating, at the receiving terminal, a session key using a transmitting-side ID, the receiving-side ID, and the receiving-side private key; extracting, at the receiving terminal, a secret key from at least a part of the session key; and decrypting, at the receiving terminal, an encrypted message using a previously set decryption algorithm and the secret key.

According to still another aspect of the present disclosure, there is provided an apparatus including: at least one processor; a memory; and at least one program. The at least one program is stored in the memory, and configured to be executed by the at least one processor. The program includes commands for: having a transmitting-side private key corresponding to a transmitting-side ID issued by a key issuing server; generating a session key using the transmitting-side ID, a receiving-side ID, and the transmitting-side private key; extracting a secret key from at least a part of the session key; and encrypting a message using a previously set encryption algorithm and the secret key.

According to yet another aspect of the present disclosure, there is provided an apparatus including: at least one processor; a memory; and at least one program. The at least one program is stored in the memory, and configured to be executed by the at least one processor. The program includes commands for: having a receiving-side private key corresponding to a receiving-side ID issued by a key issuing server; generating a session key using a transmitting-side ID, the receiving-side ID, and the receiving-side private key; extracting a secret key from at least a part of the session key; and decrypting an encrypted message using a previously set decryption algorithm and the secret key.

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, detailed embodiments of the present disclosure will be described with reference to the accompanying drawings. However, the embodiments are merely examples and are not to be construed as limiting the present disclosure.

When it is determined that the detailed description of known art related to the present disclosure may obscure the gist of the present disclosure, the detailed description thereof will be omitted. Terminology described below is defined considering functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided only to efficiently describe the spirit of the present disclosure to those of ordinary skill in the art.

Figure 1:
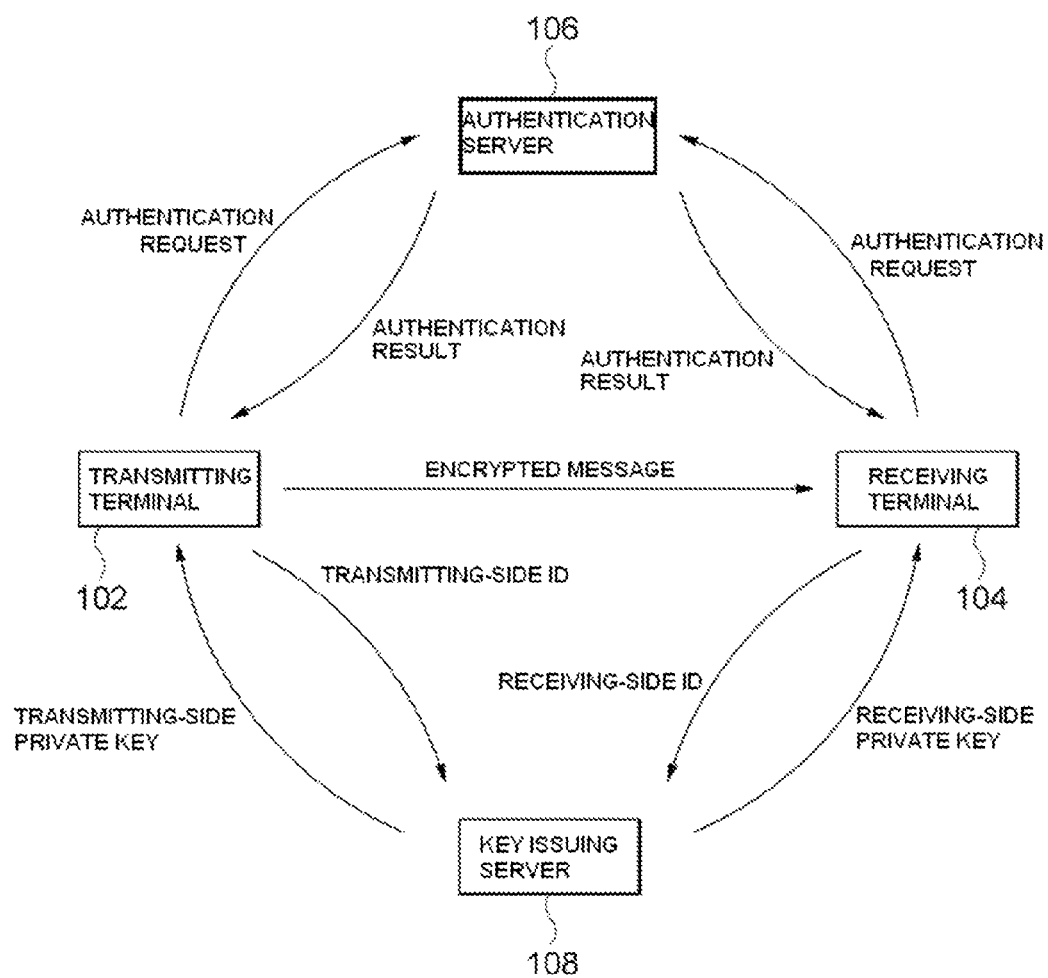
FIG. 1 is a block diagram illustrating an identifier (ID)-based encryption and decryption system according to an exemplary embodiment of the present disclosure.

FIG. 1 is a block diagram illustrating an identifier (ID)-based encryption and decryption system according to an exemplary embodiment of the present disclosure. As shown in the drawing, an ID-based encryption and decryption system 100 according to an exemplary embodiment of the present disclosure includes a transmitting terminal 102, a receiving terminal 104, an authentication server 106, and a key issuing server 108.

The transmitting terminal 102 is a terminal for encrypting a message and transmitting the encrypted message to the receiving terminal 104. The transmitting terminal 102 generates a secret key for message encryption using its own ID (i.e., transmitting-side ID), a receiving-side ID, and a transmitting-side private key calculated from the transmitting-side ID, encrypts a message using the secret key and a previously set encryption algorithm, and then transmits the encrypted message to the receiving terminal 104. The receiving terminal 104 is a terminal for extracting a message by decrypting a received message. The receiving terminal 104 receives the encrypted message from the transmitting terminal 102, generates a secret key for decrypting the encrypted message using the transmitting-side ID, the receiving-side ID, and a receiving-side private key calculated from the receiving-side ID, and decrypts the encrypted message using the secret key and a previously set decryption algorithm. At this time, the transmitting-side ID and the receiving-side ID are identification information for identifying the transmitting terminal 102 and the receiving terminal 104 respectively, and various kinds of information, for example, a media access control (MAC) address of each terminal, a unique identification number given to the terminal, an ID of each terminal user, a telephone number, etc., making it possible to distinguish a specific terminal from other terminals may be used without restriction. The transmitting-side private key and the receiving-side private key are issued by the key issuing server 108 that will be described below, and an authentication process may be performed by the authentication server 106 for issue of the transmitting-side private key and the receiving-side private key. In an exemplary embodiment of the present disclosure, cryptographically safe symmetric key-based algorithms may be used as the encryption algorithm and the decryption algorithm. A symmetric key-based algorithm denotes an algorithm in which the same cryptographic key is used for encryption and decryption. In a general symmetric key-based algorithm, decryption is performed in a reverse order of encryption.

The authentication server 106 is a server for authenticating the transmitting terminal 102 and the receiving terminal 104. In the present disclosure, IDs assigned to the transmitting terminal 102 and the receiving terminal 104 are used for message encryption and decryption, and it is necessary to authenticate whether or not respective terminals are legal owners of the corresponding IDs before performing encryption and decryption processes. Accordingly, the authentication server 106 receives an authentication request including an ID of the transmitting terminal 102 or the receiving terminal 104 from the corresponding terminal, and authenticates the transmitting terminal 102 or the receiving terminal 104 in response to the received authentication request. According to exemplary embodiments, the authentication result may be transmitted to the transmitting terminal 102 or the receiving terminal 104, the key issuing server 108 to be described below, or all of them.

The key issuing server 108 receives the transmitting-side ID and the receiving-side ID from the transmitting terminal 102 and the receiving terminal 104 respectively, and issues the transmitting-side private key and the receiving-side private key corresponding to the received transmitting-side ID and receiving-side ID to the transmitting terminal 102 and the receiving terminal 104. To this end, the key issuing server 108 includes a private key generator (PKG), and the private key issuing device may be present as one element of the key issuing server 108 or configured to exchange data with the key issuing server 108 via a communication network, etc. as a separate element from the key issuing server 108. The private key issuing device calculates a private key corresponding to a received ID on the basis of a previously set system parameter, its own master key, and pre-calculated data corresponding to a trapdoor discrete logarithm (TDL) group. Details of issue of the private keys will be described later.

As described above, the key issuing server 108 may be configured to issue a private key only to an authenticated terminal, and to this end, the key issuing server 108 may receive an authentication result of a terminal from the authentication server 106. Also, it has been described that the authentication server 106 and the key issuing server 108 may be configured as separate entities in the illustrated exemplary embodiment, but the authentication server 106 and the key issuing server 108 may be elements in the same computer system. This is the same for the aforementioned PKG as mentioned above.

Figure 2:
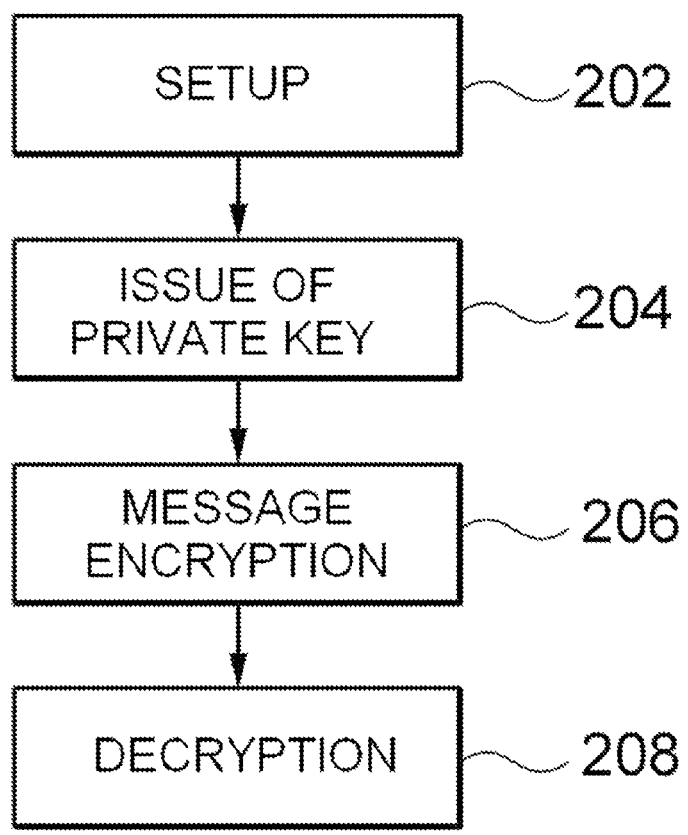
FIG. 2 is a flowchart illustrating overall steps of an ID-based encryption and decryption algorithm according to an exemplary embodiment of the present disclosure.

Details of encryption and decryption in the ID-based encryption and decryption system 100 having the above-described constitution will be described below. An exemplary embodiment of the present disclosure proposes an ID-based core cryptographic algorithm capable of efficient encryption and decryption in a TDL group. As shown in FIG. 2, the algorithm includes four steps of setup 202, issue of a private key 204, encryption 206, and decryption 208. In the setup step 202 among the steps, elements of an overall system are defined, and in the private key issuing step 204, the PKG generates private keys corresponding to a user's ID on the basis of a master key. In the encryption step 206, a transmitter encrypts a message to be transmitted using a receiver's ID, and in the decryption step 208, the receiver decrypts the received ciphertext using a private key corresponding to his or her own ID.

Setup 202

In the setup step according to an exemplary embodiment of the present disclosure, parameters used for message encryption and decryption are defined. First, for a given security parameter of 1, N=pq is calculated from two prime numbers of similar sized values that satisfy p≡1 (mod 4) and q≡3 (mod 4) respectively. Here, p and q are prime numbers that satisfy a security level corresponding to the given security parameter and are cryptographically safe. A security parameter denotes an element of an algorithm whereby time and cost of a basic attack on an encryption algorithm are determined. Here, the basic attack denotes an attack based on exhaustive search of searching all possible key candidates until a key satisfying given data (plaintext and ciphertext) is found. Since time taken for an exhaustive search depends on the number of possible keys, and the number of keys is determined according to a length of the keys, a security parameter denotes the length of the keys in this case.

Next, a first hash function $H_1$ and a second hash function $H_2$ used for message encryption and decryption is defined. Suppose that a generator of a maximal cyclic subgroup G of a finite group $Z_N = \{0, 1, 2, \ldots, N-1\}$ is g. The first hash function $H_1$ is defined as follows.

$$H_1: \{0,1\}^* \to G$$

(where $\{0, 1\}^*$ means an arbitrary bit between 0 and 1)

As the first hash function $H_1$, a random hash function, for example, SHA1, SHA-256, SHA-512, etc., may be used, and a Jacobi symbol, etc. may be used to map an arbitrary bit string that is an output value of the random hash function to the group G.

Also, the second hash function $H_2$ is defined as follows.

$$H_2: \{0,1\} \rightarrow \{0,1\}^n$$

(where $\{0, 1\}^n$ means a bit string of n bits composed of arbitrary bits each of which has a value of 0 or 1)

As the second hash function $H_2$, a random hash function, for example, SHA1, SHA-256, SHA-512, etc., may also be used, and an output value may be a random n-bit string. Here, the value of n may be 128, 160, 512, etc. according to the type of a symmetric key-based encryption algorithm used in an encryption process that will be described later.

Next, a symmetric key-based cryptographic algorithm $E_{sym}: \{0, 1\}^k \rightarrow \{0, 1\}^k$ used in message encryption and decryption is defined, and also a mode of operation (MoO) to be used with the symmetric key-based cryptographic algorithm is defined. Here, a message size k of the symmetric key-based cryptographic algorithm may be the same as n, or have a value related to n (e.g., k=½*n).

A system parameter $param_R$ and master key $mk_{root}$ derived through such a process are as follows.

$$param_R = (N, G, g, H_1, H_2, E_{sym}, MoO)$$

$$mk_{root} = (p, q)$$

Issue of Private Key 204

In this step, a transmitting-side or receiving-side private key is issued on the basis of the transmitting-side ID or receiving-side ID received by the key-issuing server 108. The PKG of the key-issuing server 108 calculates a private key corresponding to a given ID on the basis of the system parameter $param_R$, the master key $mk_{root}$, and pre-calculated data corresponding to a TDL group. When the PKG has specific information called a trapdoor, it is possible to mathematically and relatively easily calculate a discrete logarithm. Otherwise, there is a group whose discrete logarithm is very difficult to calculate, and the group is referred to as a TDL group. In the present disclosure, a private key corresponding to each ID is calculated using characteristics of such a TDL group. In other words, the PKG stores pre-calculated data of respective values corresponding to TDL groups in the form of, for example, a table, etc., and calculates a private key corresponding to a received ID using the received ID and the pre-calculated data stored in the table. Specifically, the PKG converts a received ID into an element of a TDL group G using the first hash function $H_1$, and calculates a discrete logarithm of $H_1(ID)$ with respect to a base g using the pre-calculated data mentioned above. This is as follows.

$$\text{Private key } x = \log_g(H_1(ID))$$

As described above, a user should perform a process of authenticating ownership of his or her ID and a user authentication process in advance of the private key issuing process. Also, online or offline connection and data transmission for issuing a private key should be safely secured in terms of cryptology and information and communication security.

Encryption 206

In this step, a message m to be transmitted from the transmitting terminal 102 to the receiving terminal 104 is encrypted. Suppose that an ID of the transmitting terminal 102 is A, and an ID of the receiving terminal 104 is B. Through the above-described private key issuing process, the transmitting terminal 102 has a transmitting-side private key $a = \log_g(H_1(A))$ corresponding to its own ID A.

Figure 3:
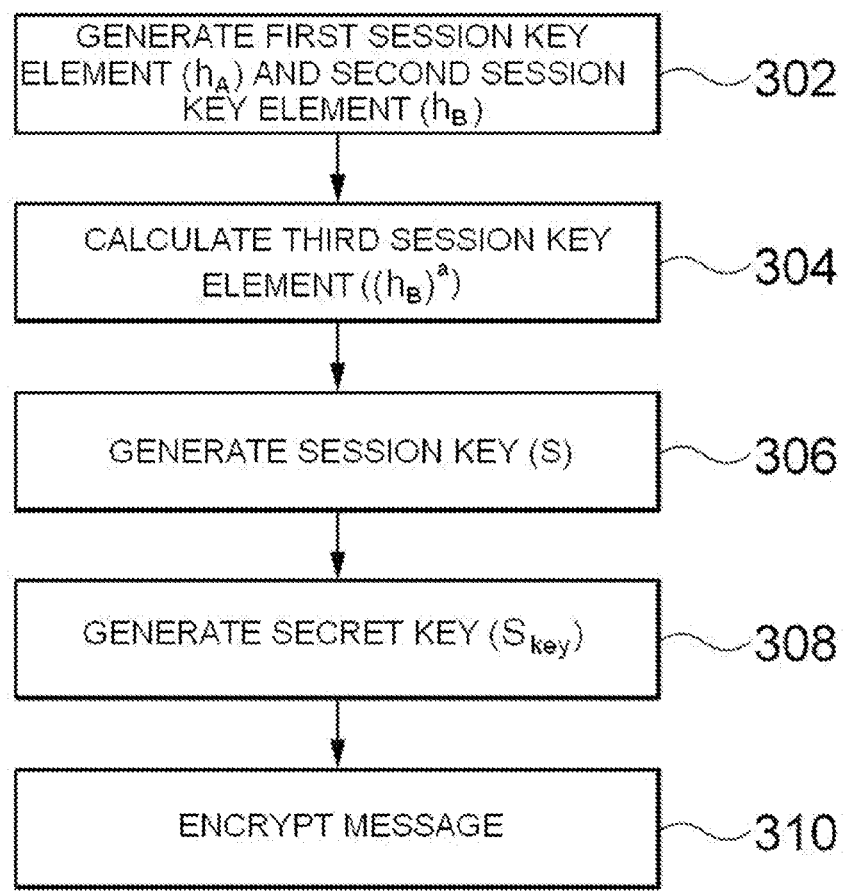
FIG. 3 is a flowchart illustrating an ID-based encryption process performed by a transmitting terminal according to an exemplary embodiment of the present disclosure.

FIG. 3 is a flowchart illustrating an ID-based encryption process performed by a transmitting terminal according to an exemplary embodiment of the present disclosure.

First, the transmitting terminal 102 hashes the transmitting-side ID A and the receiving-side ID B using the first hash function $H_1$, thereby generating a first session key element $h_A$ and a second session key element $h_B$ (302). This is expressed by the following equations.

$$h_A = H_1(A)$$

$$h_B = H_1(B)$$

Here, the transmitting terminal 102 may calculate and store $h_A$ that is an output value of the first hash function $H_1$ corresponding to its own ID in advance. When a hash value of the receiving-side ID B is also stored, the stored value can be used thereafter to transmit a message to the same receiving terminal 104 without calculating the hash value again.

Next, the transmitting terminal 102 calculates the second session key element $h_B$ to the power of the transmitting-side private key a, thereby generating a third session key element $(h_B)^a$ (304). After that, the transmitting terminal 102 generates a session key generation bit string including the first session key element, the second session key element, and the third session key element, and hashes the session key generation bit string using the second hash function $H_2$, thereby generating a session key S (306). First, the session key generation bit string may be generated as follows by concatenating values of $h_A$, $(h_B)^a$, and $h_B$ calculated above.

Session key generation bit string: $(h_A \| (h_B)^a \| h_B)$

Here, a concatenation order of the respective session key elements constituting the session key generation bit string is not particularly limited, but it is apparent that the session key elements should be concatenated in the same order between the transmitting terminal 102 and the receiving terminal 104.

Meanwhile, when a session key generation bit string is generated in this way, there is a problem in that the same session key generation bit string is generated between the same transmitter and the same receiver every time. To solve this problem, an additional bit string (first additional bit string) may be further included in the session key generation bit string. For example, an additional bit string is included as follows.

Session key generation bit string=$(h_A \| (h_B)^a \| h_B \| \text{first additional bit string})$ Here, the first additional bit string may have a different value, for example, a message generation date or time, a serial number of a message, etc. each time, and may be information sharable between the transmitting terminal 102 and the receiving terminal 104. When an additional bit string is added to a session key generation bit string in this way, it is possible to generate a different session key generation bit string each time, and thus a session key to be described below is changed each time.

When a session key generation bit string is generated in this way, the transmitting terminal 102 hashes the session key generation bit string using the second hash function $H_2$, thereby generating a session key. In other words, a session key is generated as follows.

$$S = H_2(\text{session key generation bit string})$$

Next, the transmitting terminal 102 extracts a secret key $S_{key}$ from at least a part of the generated session key S (308). For example, the session key itself may be a secret key (i.e., $S = S_{key}$). Alternatively, a part of a binary bit string constituting the session key S may be assigned to the secret key $S_{key}$, and the binary bit string other than the part assigned to the secret key may be assigned to an initialization vector (IV) for message encryption. For example, when SHA-256 is used as the second hash function $H_2$, the session key S becomes a 256-bit random binary string, and by assigning lower (or upper) 128 bits of the 256-bit random binary string to the secret key $S_{key}$ and upper (or lower) 128 bits to the IV such as a cipher block chaining (CBC) mode, it is possible to apply the session key S to a symmetric key-based cryptographic algorithm having a secret key of 128 bits (e.g., AES-128, etc.). In other words, it is satisfied that $S=S_{key}||IV$ or $IV||S_{key}$ in this case. However, this method cannot be applied to a counter (CTR) mode, etc. in which a different IV value is necessary each time, and in this case, an IV generation algorithm is additionally necessary.

Next, the transmitting terminal 102 encrypts a message using the previously set symmetric key-based encryption algorithm $E_{sym}$ and the secret key $S_{key}$, thereby generating a ciphertext C (310) (i.e., C=MoO($E_{sym}(S_{key}, m)$, IV)). For example, when SHA-256, AES-128, and the CBC mode are used as the second hash function $H_2$, the symmetric key-based encryption algorithm $E_{sym}$, and an MoO respectively, if S equal to $S_{key}||IV$ is used, it is satisfied that C=AES-$CBC_{(Skey, IV)}(m)$.

Meanwhile, when the original message m that is input information and the secret key $S_{key}$ are not changed, the ciphertext C that is an output value is not changed either due to characteristics of the symmetric key-based encryption algorithm. To prevent this, in the encryption step, an additional bit string (second additional bit string) previously set between the transmitting terminal 102 and the receiving terminal 104 is added to the message, so that a different output value (ciphertext) can be obtained from the same input value (original message) each time. In this case, the receiving terminal 104 can obtain the original message m as it is by removing the second additional bit string after decryption of the ciphertext Like the first additional bit string, the second additional bit string may have a different value, for example, a message generation date or time, a serial number of a message, etc. each time, and may be a value sharable between the transmitting terminal 102 and the receiving terminal 104.

When the ciphertext C is generated through such a process, the transmitting terminal 102 transmits the generated ciphertext C and the ID A of the transmitting terminal 102 to the receiving terminal 104.

Decryption 208

In this step, the receiving terminal 104 decrypts the ciphertext C transmitted from the transmitting terminal 102. Suppose that the ID of the transmitting terminal 102 is A, and the ID of the receiving terminal 104 is B. Through the above-described private key issuing process, the receiving terminal 104 has a receiving-side private key $b=\log_g(H_1(B))$ corresponding to its own ID B.

Figure 4:
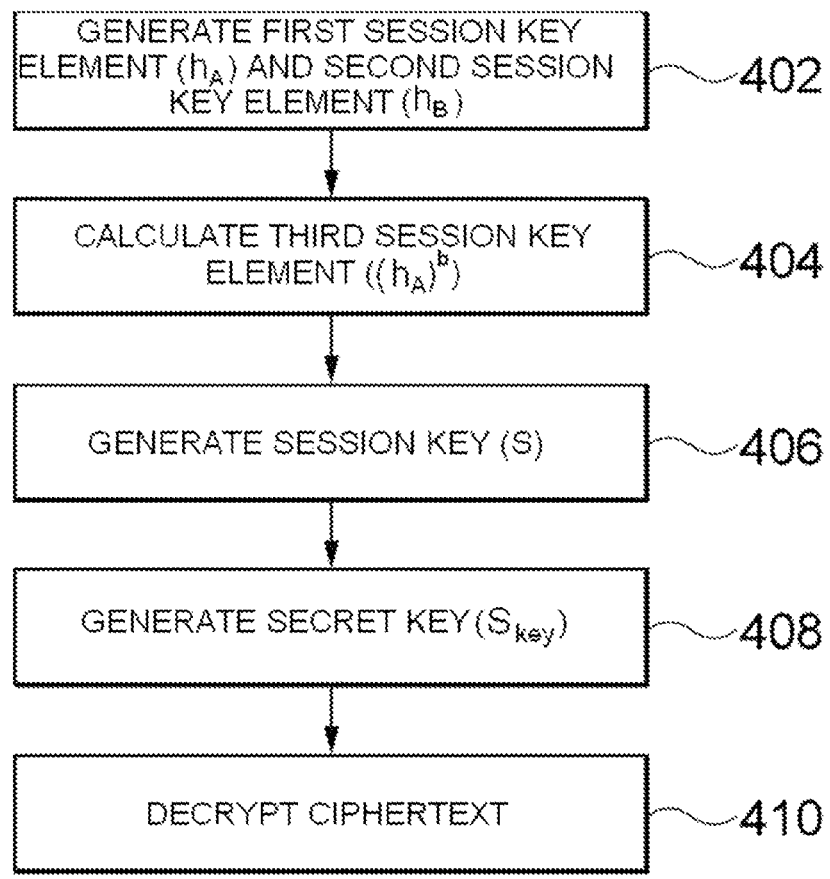
FIG. 4 is a flowchart illustrating an ID-based decryption process performed by a receiving terminal according to an exemplary embodiment of the present disclosure.

FIG. 4 is a flowchart illustrating an ID-based decryption process performed by a receiving terminal according to an exemplary embodiment of the present disclosure.

First, the receiving terminal 104 hashes the transmitting-side ID A and the receiving-side ID B using the first hash function $H_1$, thereby generating a first session key element $h_A$ and a second session key element $h_B$ (402). This is expressed by the following equations.

$$h_A = H_1(A)$$

$$h_B = H_1(B)$$

Here, the receiving terminal 104 may calculate and store $h_B$ that is an output value of the first hash function $H_1$ corresponding to its own ID B in advance. When a hash value of the transmitting-side ID A is also stored, the stored value can be used thereafter to receive a message from the same transmitting terminal 102 without calculating the hash value again.

Next, the receiving terminal 104 calculates the first session key element $h_A$ to the power of the receiving-side private key b, thereby generating a third session key element $(h_A)^b$ (404). As can be seen from the equation below, the third session key element of the receiving side generated in step 404 is the same as that of the transmitting side generated in step 304. In other words, according to exemplary embodiments of the present disclosure, it is possible to have the same secret key between the transmitting side and the receiving side without a key exchange process.

$$(h_A)^b = (h_B)^a = g^{ab}$$

Next, the receiving terminal 104 generates a session key generation bit string including the first session key element, the second session key element, and the third session key element, and hashes the session key generation bit string using the second hash function $H_2$, thereby generating a session key S (406). At this time, the receiving terminal 104 uses the same rules for generating the session key generation bit string as the transmitting terminal 102, and in case of need, may add a first additional bit string that has been set in advance between the receiving terminal 104 and the transmitting terminal 102. Through such a process, the same session key as that of the transmitting terminal 102 is generated.

Next, the receiving terminal 104 extracts a secret key $S_{key}$ from at least a part of the generated session key S (408). In other words, in this step, a secret key or a secret key/IV pair is extracted using the same method as in step 308.

Finally, the receiving terminal 104 decrypts the received ciphertext using a shared IV according to a previously set symmetric key-based encryption algorithm $E_{sym}$, the secret key $S_{key}$, and an MoO, thereby recovering the message (410). At this time, when a second additional bit string has been added to the decrypted message, a process of removing the second additional bit string is additionally performed.

Meanwhile, an exemplary embodiment of the present disclosure may include a computer-readable recording medium including a program for performing the methods described herein on a computer. The computer-readable recording medium may separately include program commands, local data files, local data structures, etc. or include a combination of them. The medium may be specially designed and configured for the present disclosure, or known and available to those of ordinary skill in the field of computer software. Examples of the computer-readable recording medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers. A computer, such as the one mentioned above, is very familiar to those who practice in these technical arts. Therefore, the discussion herein has avoided obscuring the key features of the exemplary embodiments by purposefully omitting details concerning the manner in which a hardware processor of such a computer system uses the above-identified computer-readable codes and data storage device to carry out the various functions or implement the various units previously mentioned. Likewise, since a person familiar with this field understands that such functions and units may be implemented through various combinations of hardware and/or software, such implementation details are likewise omitted.

Since exemplary embodiments of the present disclosure involve a remarkably less amount of calculation but can maintain a satisfactory level of security, it is possible to provide an encryption and decryption algorithm that can be readily applied to a mobile terminal having limited computing power, memory capacity, etc. For example, in existing public key-based cryptography, a random value should be generated every time, and thus exponentiation is required for every encryption/decryption. On the other hand, in exemplary embodiments of the present disclosure, only encryption is performed using the same session key without exponentiation once exponentiation is performed upon issue of a private key, and thus a remarkably less amount of calculation is required compared to existing cryptography.

In addition, exemplary embodiments of the present disclosure have a remarkably smaller ciphertext size than an existing ciphertext size, and can reduce network traffic for transmitting and receiving the ciphertext.

It will be apparent to those skilled in the art that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. An identifier (ID)-based encryption method, comprising:
   storing, at a transmitting terminal, a transmitting-side private key corresponding to a transmitting-side ID issued by a key issuing server;
   generating, at the transmitting terminal, a first session key element and a second session key element from the transmitting-side ID and a receiving-side ID, respectively;
   generating, at the transmitting terminal, a third session key element from the second session key element;
   generating, at the transmitting terminal, a session key from a session key generation bit string, the session key generation bit string including the first session key element, the second session key element, and the third session key element;
   extracting, at the transmitting terminal, a secret key from at least a part of the session key; and
   encrypting, at the transmitting terminal, a message using a previously set encryption algorithm and the secret key.

2. The ID-based encryption method of claim 1, wherein:
   the generating of the first session key element and the generating of the second session key element are performed by hashing the transmitting-side ID and the receiving-side ID, respectively, using a first hash function;
   the generating of the third session key element is performed by calculating the second session key element to a power of the transmitting-side private key; and
   the generating of the session key includes hashing the session key generation bit string using a second hash function.

3. The ID-based encryption method of claim 2, wherein the transmitting-side private key is calculated according to the following equation:

$a = \log_g(H_1(A))$ where:
   a is the transmitting-side private key,
   H1 is the first hash function,
   A is the transmitting-side ID,
   g is a generator of a maximal cyclic subgroup of a group,
   N is an integer satisfying N=pq, and
   p and q are prime numbers that satisfy p≡1 (mod 4) and q≡3 (mod 4) respectively).

4. The ID-based encryption method of claim 3, wherein the first hash function is set to map an arbitrary binary bit string to an arbitrary element in the maximal cyclic subgroup.

5. The ID-based encryption method of claim 1, further comprising previously setting a first additional bit string between the transmitting terminal and the receiving terminal, wherein the generating of the session key generation bit string is performed so as to further include the first additional bit string.

6. The ID-based encryption method of claim 1, wherein the extracting of the secret key further includes:
   extracting a part of a binary bit string constituting the session key;
   assigning the extracted part to the secret key; and
   assigning the binary bit string, excluding the part assigned to the secret key, to an initialization vector (IV) for encrypting the message.

7. The ID-based encryption method of claim 6, wherein the encrypting of the message is performed using:
   the encryption algorithm,
   a mode of operation (MoO) of the encryption algorithm,
   the secret key, and
   the IV.

8. The ID-based encryption method of claim 7, further comprising previously setting a second additional bit string between the transmitting terminal and the receiving terminal, wherein the encrypting of the message further includes adding the second additional bit string to the message.

9. An identifier (ID)-based decryption method, comprising:
   storing, at a receiving terminal, a receiving-side private key corresponding to a receiving-side ID issued by a key issuing server;
   generating, at the receiving terminal, a first session key element and a second session key element from a transmitting-side ID and the receiving-side ID, respectively;
   generating, at the receiving terminal, a third session key element from the first session key element;
   generating, at the receiving terminal, a session key from a session key generation bit string, the session key generation bit string including the first session key element, the second session key element, and the third session key element;
   extracting, at the receiving terminal, a secret key from at least a part of the session key; and
   decrypting, at the receiving terminal, an encrypted message using a previously set decryption algorithm and the secret key.

10. The ID-based decryption method of claim 9, wherein:
    the generating of the first session key element and the generating of the second session key element are performed by hashing the transmitting-side ID and the receiving-side ID respectively using a first hash function;
    the generating of the third session key element is performed by calculating the first session key element to a power of the receiving-side private key, and
    the generating of the session key is includes hashing the session key generation bit string using a second hash function.

11. The ID-based decryption method of claim 10, wherein the receiving-side private key is calculated according to the following equation:

$$b = \log_g(H_1(B))$$

where:
- b is the receiving-side private key,
- H1 is the first hash function,
- B is the receiving-side ID,
- g is a generator of a maximal cyclic subgroup of a group,
- N is an integer satisfying N=pq, and
- p and q are prime numbers that satisfy p≡1 (mod 4) and q≡3 (mod 4) respectively.

12. The ID-based decryption method of claim 11, wherein the first hash function is set to map an arbitrary binary bit string to an arbitrary element in the maximal cyclic subgroup.

13. The ID-based decryption method of claim 9, further comprising previously setting a first additional bit string between the transmitting terminal and the receiving terminal, wherein the generating of the session key generation bit string is performed so as to further so as to include the first additional bit string.

14. The ID-based decryption method of claim 9, wherein the extracting of the secret key further includes:
   extracting a part of a binary bit string constituting the session key;
   assigning the extracted part to the secret key; and
   assigning the binary bit string, excluding the part assigned to the secret key, to an initialization vector (IV) for encrypting the message.

15. The ID-based decryption method of claim 14, wherein the decrypting of the message is performed using:
   the decryption algorithm,
   a mode of operation (MoO) of the decryption algorithm,
   the secret key, and
   the IV.

16. The ID-based decryption method of claim 15, further comprising previously setting a second additional bit string between the transmitting terminal and the receiving terminal, wherein the decrypting of the message further includes removing the second additional bit string from the decrypted message.

17. A non-transitory computer-readable recording medium storing a program which, when executed by a computer, causes the computer to perform an identifier (ID)-based encryption method comprising:
   storing, at a transmitting terminal, a transmitting-side private key corresponding to a transmitting-side ID issued by a key issuing server;
   generating, at the transmitting terminal, a first session key element and a second session key element from the transmitting-side ID and a receiving-side ID, respectively; generating, at the transmitting terminal, a third session key element from the second session key element;
   generating, at the transmitting terminal, a session key from a session key generation bit string, the session key generation bit string including the first session key element, the second session key element, and the third session key element;
   extracting, at the transmitting terminal, a secret key from at least a part of the session key; and
   encrypting, at the transmitting terminal, a message using a previously set encryption algorithm and the secret key, at the transmitting terminal, a message using a previously set encryption algorithm and the secret key.

18. An apparatus, comprising:
   at least one hardware processor;
   a memory accessible by the at least one hardware processor; and
   at least one program stored in the memory;
   wherein the at least one program is configured to be executed by the at least one hardware processor, and includes commands enabling the at least one hardware processor to:
      store a transmitting-side private key corresponding to a transmitting-side identifier (ID) issued by a key issuing server;
      generate a first session key element and a second session key element from the transmitting-side ID and a receiving-side ID, respectively;
      generate a third session key element from the second session key element;
      generate a session key from a session key generation bit string, the session key generation bit string including the first session key element, the second session key element, and the third session key element;
      extract a secret key from at least a part of the session key; and
      encrypt a message using a previously set encryption algorithm and the secret key.

19. An apparatus, comprising:
   at least one hardware processor;
   a memory accessible by the at least one hardware processor; and
   at least one program stored in the memory;
   wherein the at least one program is configured to be executed by the at least one hardware processor, and includes commands enabling the at least one hardware processor to:
      store a receiving-side private key corresponding to a receiving-side identifier (ID) issued by a key issuing server;
      generate a first session key element and a second session key element from a transmitting-side ID and the receiving-side ID, respectively;
      generate a third session key element from the first session key element;
      generate a session key from a session key generation bit string, the session key generation bit string including the first session key element, the second session key element, and the third session key element;
      extract a secret key from at least a part of the session key; and
      decrypt an encrypted message using a previously set decryption algorithm and the secret key.

* * * * *